(12) United States Patent
Giles (10) Patent No.: US 7,315,978 B2
(45) Date of Patent: Jan. 1, 2008

(54) SYSTEM AND METHOD FOR REMOTE COLLECTION OF DATA

(75) Inventor: Christopher David Giles, Minneapolis, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 222 days.

(21) Appl. No.: 10/710,748

(22) Filed: Jul. 30, 2004

(65) Prior Publication Data

US 2005/0138216 A1    Jun. 23, 2005

Related U.S. Application Data

(60) Provisional application No. 60/491,500, filed on Jul. 30, 2003.

(51) Int. Cl.
*G06F 15/00* (2006.01)
*G06F 17/00* (2006.01)
*G06F 17/30* (2006.01)

(52) U.S. Cl. .............. 715/500.1; 715/501.1; 715/505; 715/508; 707/1; 707/100; 707/200

(58) Field of Classification Search ........... 715/500.1, 715/501.1, 505, 508; 707/1, 100, 200
See application file for complete search history.

(56) References Cited

U.S. PATENT DOCUMENTS

| | | | |
|---|---|---|---|
| 5,819,263 A | 10/1998 | Bromley et al. | |
| 6,141,663 A * | 10/2000 | Hunkins et al. | 707/201 |
| 6,430,542 B1 | 8/2002 | Moran | |
| 6,636,897 B1 * | 10/2003 | Sherman et al. | 709/248 |
| 2002/0049751 A1 * | 4/2002 | Chen et al. | 707/3 |
| 2002/0049764 A1 * | 4/2002 | Boothby et al. | 707/100 |
| 2002/0059256 A1 * | 5/2002 | Halim et al. | 707/10 |
| 2003/0182414 A1 * | 9/2003 | O'Neill | 709/223 |
| 2004/0181788 A1 * | 9/2004 | Kester et al. | 717/168 |
| 2005/0013104 A1 * | 1/2005 | Feague et al. | 361/683 |
| 2005/0086199 A1 * | 4/2005 | Champagne et al. | 707/1 |

OTHER PUBLICATIONS

Product Guide for Microsoft Office InfoPath 2003, Microsoft Office Systems Beta 2 Kit 2003 (51 pp.).

* cited by examiner

*Primary Examiner*—Doug Hutton
*Assistant Examiner*—Chau Nguyen
(74) *Attorney, Agent, or Firm*—Snell & Wilmer L.L.P.

(57) ABSTRACT

A system and method for managing electronic forms data, and financial advise applications is provided. Financial advisors may be equipped with portable computing devices, such as a laptop or tablet PC to provide customers in-field support through the use of financial advise applications, customer data and electronic forms. Further, the invention provides a means for applications, data and forms to be synchronized with the various computing systems of a financial services company's computing center. Such synchronization enables in-field financial advisors to work remotely yet have most of the tools and functionality provided for by the systems of the computing center.

13 Claims, 4 Drawing Sheets

SYSTEM AND METHOD FOR REMOTE COLLECTION OF DATA

CROSS REFERENCE TO RELATED APPLICATIONS

This application claims priority to, and the benefit of, U.S. Provisional Application Ser. No. 60/491,500 filed Jul. 30, 2003 and entitled "Data Collection System and Method", which is hereby incorporated by reference.

FIELD OF INVENTION

The present invention relates generally to the management of electronic forms within remote computing devices and providing reliable synchronization of both data and executable code with backend financial systems, and more particularly, to a system and method which enables in-field financial advisors to access and utilize electronic forms relating to financial products and financial advise applications utilizing a tablet PC or other portable computing device.

BACKGROUND OF INVENTION

Corporations which provide financial advice to clients and customers, either directly or through financial professionals, typically place a premium upon the delivery of consistent and complementary advice across the various channels that may be available for delivering such advice. Financial planners and planning organizations generally provide their customers with financial advice such as data, strategies, and recommendations. In addition to utilizing charts, graphs, and other visual aids for presenting this financial advice to clients, financial planners and planning organizations often use specialized calculators, simulators, formatters, and the like to augment the depth and quality of the proffered financial advice. Moreover, due to various Security and Exchange Commission, insurance, financial, legal, and other complex disclosure requirements, the financial data generated during the financial planning process should be appropriately archived, and the financial advice information delivered to the client should include the proper disclosures, disclaimers, and the like.

In addition to the disclosures and disclaimers that customers usually review and sign, financial advisors often enroll new or existing customers into new services or assist new or existing customers through application processes for financial products and services. Such enrolment and application processes often require the customer to complete one or more forms. Traditionally, financial advisors are equipped with a number of different paper forms geared to various types of financial products and services. A financial advisor may complete forms on behalf of the customer, however, the customer typically must sign forms to indicate acceptance of the information in the forms. This is most often a time consuming and tedious task. Further, when a financial advisor returns from the field, all forms and disclosures relating to a sale or change in financial services are turned over to data entry personnel. It is then the job of the data entry personnel to enter information from the forms into the appropriate database systems. This not only creates redundancy, but it creates a new layer for data entry errors to occur.

It therefore is desirable to create a system for managing applications, data and electronic forms in remote environments where a means for connecting to a financial services company computing center is either not conveniently present or not accessible. Additionally, it is desirable to provide a system for presenting forms electronically and collecting form data through a pen based PC, such as a tablet PC.

SUMMARY OF INVENTION

The present invention overcomes the limitations and problems of the prior art by providing a system and method for managing electronic forms and financial advice applications in remote environments. The system provides a secure, reliable and convenient means to support in-field financial advisors by providing the advisor with the most current forms, data and applications and providing a means to compile and present the appropriate forms to be completed electronically by advisors and/or customers.

The invention includes a method for managing electronic forms which includes: transmitting at least one host form having form fields from a host to a remote device having a remote database; entering form data into the form fields to create a remote form; communicating with the host to transmit the remote form to the host; mapping the form fields to database record fields within a database of the host; and, synchronizing the host database with the remote database.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Figure 1:
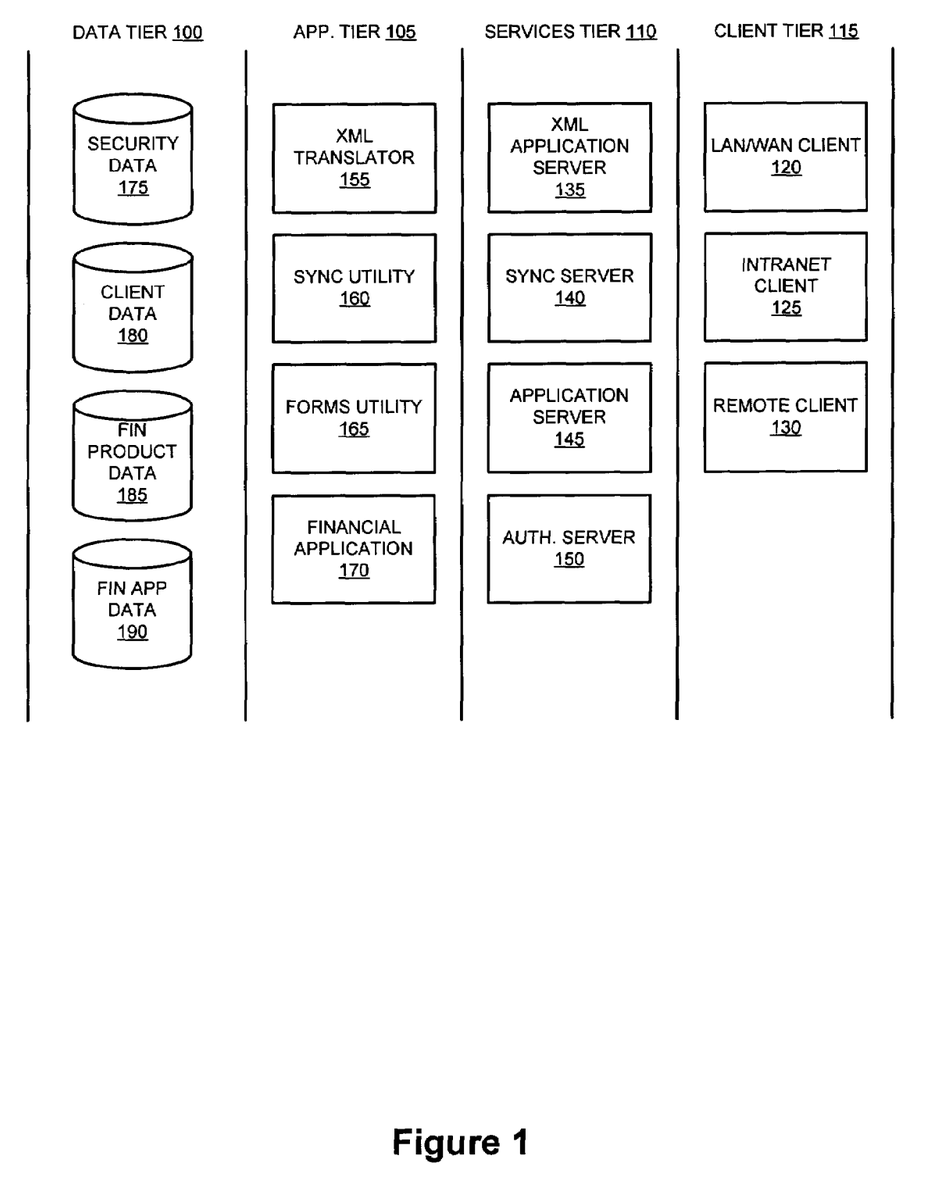
FIG. 1 is a diagram illustrating an exemplary grouping of system components and functionality into tiers.

In general, the invention includes a system and method for managing electronic forms and/or financial advise applications within various computing environments. Referring to FIG. 1, the system may best be described in tiers. The client tier 115 may comprise one or more client types differentiated from each other by the means each employ to communicate with and communicate with the various systems of the present invention.

A client, as used herein, unless specifically stated otherwise, may comprise any hardware and/or software suitably configured to interact with the system, such as a personal computer, personal digital assistant, laptop computer, tablet computer, network computer, workstation, minicomputer, mainframe, and/or the like. A client may be equipped with a device to facilitate communications such as a modem or Ethernet card. A client may communicate with the various components of the present invention through any system, device or method discussed herein or known in the art.

A local area network (LAN) or wide area network (WAN) client 120 may include local workstations and personal computers that interact with the system components through dedicated network connections. A LAN connects computers in a relatively small area, such as the same floor or building, or a group of buildings like a campus. An example of a LAN connection would be an Ethernet connection between a client computing unit and various servers, hosts, and mainframe systems. A WAN is a physical or logical network that provides capabilities for a number of independent devices to communicate with each other over a common transmission-interconnected topology in geographic areas larger than those served by local area networks.

An intranet client 125 may interact with the various system components of the present invention through a standard dial-up connection to a secured Internet server or through a high-speed connection such as DSL or cable. An intranet client 125 may not interact with a services tier 110 directly, but through an intranet server (not shown) which may serve as an liaison between an intranet client 125 and an authentication server 150, for example.

A remote client 130 may have only an occasional connection to the system components of the present invention. A remote client 130 may retain within memory a full or partial replication of computer programs and data that are stored within an applications tier 105 and/or data tier 100 of the present invention. A remote client 130 may be provided the same utility as a LAN/WAN client 120 or an intranet client 125 although all of the applications and data may reside in the device's memory. A remote client 130 may occasionally communicate with the various systems of the present invention through a LAN/WAN or Intranet connection in order to synchronize it's applications and/or data with that of an applications tier 105 and/or data tier 100.

A services tier 110 may comprise hardware and/or software suitably configured to manage transactions between the client tier 115 and applications tier 105. A services tier 110 may receive requests from a client tier 115 and process, format, and route the request to the appropriate application in the applications tier 105. Further, services tier 110 may facilitate the transfer of data between a client tier 115 and a data tier 100 independent of the applications tier 105.

The data migration mechanism utilized in the exemplary system may include a conversion server, such as XML application server 145, which enables components within the services tier 110 to send suitably standardized data to the data tier 100, and a translator, such as XML translator 155, which enables the data tier 100 to send suitably standardized data to the applications server 145 and among other components within the services tier 110. In an exemplary embodiment, the XML translator 155 is the subsystem responsible for retrieving or reading objects from the services tier 110 and translating those objects into a suitable standardized data format, such as XML for example.

The process of translating objects into XML may be referred to as "externalization" and, conversely, reading in XML and translating into suitable objects may be referred to as "internalization". In an exemplary embodiment, an XML translator 155 includes a hierarchy of translators which suitably correspond to the many types of objects that that may require translation. An XML translator 155 may implement the translation of any suitable programming or scripting language, such as Java, Smalltalk, and/or the like.

Synchronization server 140 facilitates the synchronization of data between a remote client 130 with a suitable connection to a synchronization server 140. Synchronization server initiates a synchronization utility 160 which contains logic enabling it to compare data stored within a remote client's 130 local database with data stored within any number of databases in the data tier 100. A synchronization utility 160 may examine records within various databases to determine if new records have been added, deleted, or modified and flag databases that should be updated. Further, a synchronization utility 160 may query a database in the data tier 100 in order to determine if a database structure has been changed. If this is the case, synchronization utility 160 may transmit a new replication of the database to a remote client 130. A synchronization utility 160 ensures that the replicated databases residing on the remote client 130 and the one or more databases within the data tier 100 contain consistent and accurate data.

A synchronization server 140 may also employ a synchronization utility 160 to ensure that computer programs and executable code residing on a remote client 130 are consistent with those residing in the applications tier 105. For example, a financial adviser equipped with a remote client 130 may have financial application loaded into it's local memory in order to utilize the financial application while in the field. If a developer modifies financial application 170 within the applications tier 105, the remote client 130 will be operating an outdated version of the financial application. However, if the remote client 130 connects to the synchronization server 140, the synchronization utility 160 may compare the financial application of the remote client 130 to the financial application 170 in the applications tier 105. This comparison may be executed by any means known in the art such as, for example, calculating a hash value for each application or by a more simple method of comparing application version data and/or modification dates. If a financial application on a remote client 130 is found to be inconsistent with it's counterpart within an applications tier 105, then a synchronization server 140 may load a new application onto the remote client 130.

An applications server 145 may process requests from the client tier 115 in order to provide a user with access to the appropriate applications. Applications server 145 may communicate with any suitable number client systems and any suitable number of applications. Further, an applications server may import any suitable number of third-party services, tools, or applications for use by components within the client tier 115, services tier 110, applications tier 105 and data tier 110. The applications server 145 suitably provides a framework for handling client/server communications by listening for requests from multiple clients in the client tier 115 and spawning threads to handle each client communication. The applications server 145 may also provide mechanisms for maintaining contextual information across connections, thereby providing a virtual communications across many requests.

Authentication server 150, such as the American Express® DSS Service, may be configured for authenticating or authorizing use of the various components in the applications tier 105 by a system in the client tier 115. Authentication server 150 may include a database 175 for storing appropriate data used in authenticating a user in the client tier 115. Security data 175 may be any suitable database, including an object-oriented database, a relational database, and/or the like. Any suitable authenticating data may be stored in security database 180 and may include data such as a client identification number, a password, a pass phrase, any combination of these, and/or the like.

A forms utility 165 may comprise any software and/or hardware suitably configured to construct, compile, serve, validate, and parse form data. Forms utility 165 may comprise one or more third party tools, custom tools, or a combination thereof. For example, the forms utility may employ Microsoft Office InfoPath™ to enable developers to author customized forms and define business logic and rules to imbed in the forms. Form fields may be mapped to any number of different databases in the data tier 100 and to any number of database record fields.

The data tier 100 may comprise any number of databases, database management systems, backend servers, mainframes and any other components of a financial management system.

As will be appreciated by one of ordinary skill in the art, the present invention may be embodied as a customization of an existing system, an add-on product, upgraded software, a stand alone system (e.g., kiosk), a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

An advisor, as used herein, may include any end-user who interacts with the present invention and participates in and/or directs customers in the completion of forms required in the sale of financial products. Such advisor may be an individual, an entity, a business, a financial professional, software, hardware, and/or the like. An advisor may also interact with financial advice applications which may include, for example, financial simulators, equity evaluators, asset allocation, financial calculators, and the like.

A customer, as used herein, may be an individual, a family unit, a business, an entity, an organization, a government entity, software, hardware, or anyone who interacts with an advisor to shop and/or configure financial products. A customer may include, for example an individual shopping for investment accounts, retirement accounts, insurance products and the like. Further, a customer may comprise a business who is in need of a business line of credit, loans, wholesale purchasing programs, accounting services, etc.

Figure 2:
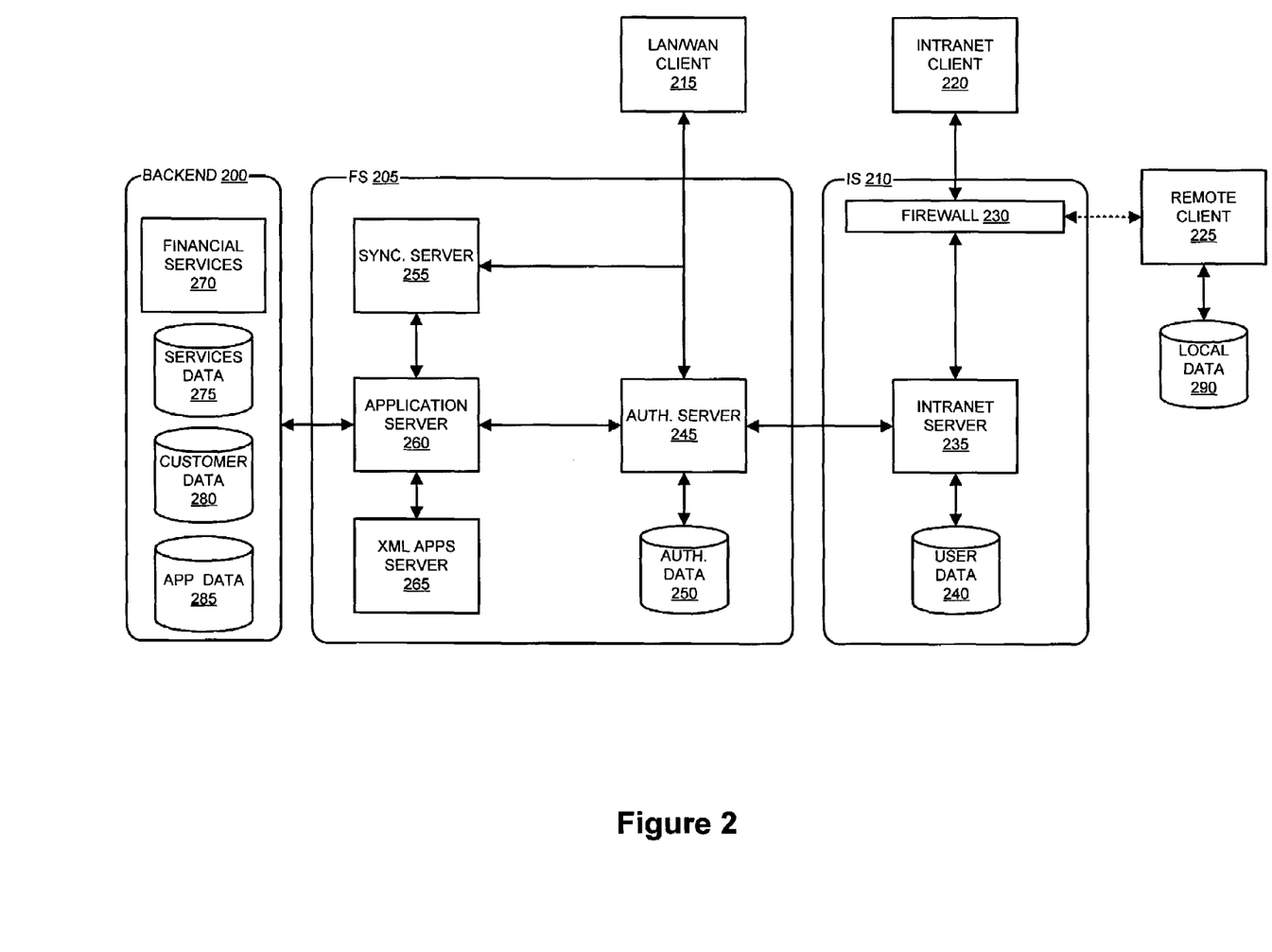
FIG. 2 is a block diagram illustrating major system components for an exemplary system for supporting various client systems.

FIG. 2 is a block diagram illustrating exemplary relationships between the major system components for an exemplary system for supporting various client systems. A LAN/WAN client 225 may communicate with an authentication server 245 in order to enter credentials identifying the user as an authorized user of the system. The LAN/WAN client 215 connection should be assumed to be over a secure private network, therefore connecting through an intranet portal may not be required. An intranet client 220 and remote client 225 may communicate with an intranet server 235 through a secure or unsecured network connection such as a dial-up, cable, or DSL connection. A remote client 225 may include one or more local databases 290 that comprise data replicated from corresponding backend 200 databases. A connection to an intranet server 235 may pass through a firewall in order to protect components within the intranet services (IS) 210.

Firewall 230 may include any hardware and/or software suitably configured to protect intranet server 235 from users from other networks and provide limited or restricted access to intranet clients 220 and remote clients 225. Firewall 230 may comprise varying configurations including Stateful Inspection, Proxy based and Packet Filtering among others. Firewall 230 may be integrated within intranet server 235, any other system components or may reside as a standalone component of the present invention.

Intranet server 235 may include any hardware and/or software suitably configured to serve webpages and to receive and process requests from clients. An intranet server may be advantageous to the present invention by restricting access to unauthorized users through requiring users to provide authentication credentials. This may include any combination of a user ID, password, access code or any other means known in the art for authenticating users. Authentication credentials may be maintained within a user database 240 which may include any hardware and/or software suitably configured to facilitate storing user credentials. Intranet server 235 may send requests to the user database 240 in order to validate user supplied credentials. User database 240 may include any hardware and/or software suitably configured to facilitate storing user data including user authentication credentials.

Clients connecting through an IS 210 may access the systems of the financial services (FS) 205 by passing through an authentication server 245. An authentication server 245 may be desirable as not all users will access the components with the FS 205 through an IS 210. In one embodiment, authentication server 245 credentials may be stored within the user database 240 to eliminate the need for a connecting user to enter two sets of authentication data. An intranet server 235 may pass authentication server 245 a user's credentials transparently. Authorization server may send supplied credentials in a request to an authentication database 250. Authorization database 250 may include any hardware and/or software suitably configured to facilitate storing user data including user authentication credentials.

An applications server 260 may include any hardware and/or software suitably configured to facilitate transactions involving one or more applications or code components. An applications server 260 processes requests from clients and assembles one or more code components for delivery to the client based on the request type. For example, an intranet client 220 may request a report reflecting interest rate changes over a period of the previous two months. The applications server 260 may receive the request, activate a reports engine (not shown), transmit the report parameters to the reports engine, and transmit the resulting report to the requesting intranet client 220. An applications server 260 may likewise receive a request for a set of forms relating to a particular financial product. The applications server 260 may receive the request, activate a forms utility (FIG. 1, 165) which compiles the required forms, transmit form parameters to a forms utility, and transmit a forms packet to the requesting client.

An XML applications server 260 may include any hardware and/or software suitably configured to convert data and/or programming code such as Java and Visual Basic into XML. Applications server 260 may transmit data and/or programming code to XML applications server 265 in order to covert it to XML. The converted data or programming code may then be transmitted back to applications server 260 where it may then be transmitted to a requesting client.

Synchronization server 255 may be activated by applications server 260 in response to a request by a connecting remote client 225. Synchronization server 255 may include any hardware and/or software suitably configured to compare two or more data sources or executable code components in order to determine if changes have been made to one source and not one or more others. Further, synchronization server 255 may update the one or more data sources or executable code components in order to keep all related sources and components current. For example, a financial advisor working with a remote client 225 may add a new client to a locally stored database. Further, the financial advisor may have compiled one or more forms representative of a purchase of a financial product by the new customer.

A financial advisor, as used herein, may include any individual, business, entity, government organization, software and/or hardware that provides financial advice to private individuals, businesses, entities or government organizations and/or presides over the sales of financial products and services. A financial advisor may interact with customers directly or indirectly through a third party.

When the remote client 225 in connected to the FS 205 through an IS 210, applications server 260 may activate a synchronization server 255. The synchronization server 255 may examine the contents of the remote client's 225 databases to compare it to a counterpart database which is a part of the financial system's backend 200. The synchronization server 255 would recognize that the records relating to the new customer and the data captured by the new financial product forms does not exist in the counterpart backend 200 databases. The synchronization server 255 may execute a series of steps to copy the records from the remote client 225 databases to the counterpart backend 200 databases.

Financial services 270 may comprise one or more financial services which may be available for any number of financial advisors. Financial services 270, for example, may include a calculator that may be used to determine a customer's retirement account balance under varying circumstances and at different ages. An applications server 260 may access one or more financial products 270 in response to a connected client request. In the case of a remote client 225, a synchronization server 255 may ensure that the hard drive of the remote client 255 is equipped with the appropriate financial services 270.

Suitable financial service applications which may be incorporated into the present invention. For example, a system and method that provides for an effective work management tool that efficiently organizes a financial advisor's day-to-day operations, work flow, clients and prospects. The system may also allow coordinated consultation based not only on an individual's demographic information, but also on the individual's relationships to others, people and organizations are arranged into client groups and prospect groups. For additional information on such a system and method, see, for example, U.S. Pat. No 5,819,263, entitled "Incorporating Relationship and Group Management", by inventors David A. Brounley and Howard A. Hallin, issued on Oct. 6, 1998, incorporated herein by reference.

A system which includes numerous innovative and coordinated features such as a user friendly interface; unique grouping capabilities; a Virtual Executor; a financial Simulator; an Earmarker; a Strategizer; a Data Wrapper representative of real world grouping of assets, liabilities, income, and expenses; and a Proposal Constructor. For additional information on such a system and method, see, for example, U.S. Pat. No. 6,430,542 entitled "Computer-Implemented Program For Financial Planning and Advice System," by inventor William J. Moran, incorporated herein by reference.

A system and method which provides for easily configuring new financial advice applications from various services and sub-applications in order to deliver consistent advice to consumers, clients, and advisors, regardless of the delivery mechanism utilized. For additional information on such a system and method, see, for example, U.S. patent application Ser. No. 09/712,743 entitled "Systems and Methods for Creating Financial Advise Applications," by inventors Roberta L. Patnode, James Richard Geppert and David Hoyt, incorporated herein by reference.

Services database 275, customer database 280 and application database may include any hardware and/or software suitably configured to facilitate storing information relating to the various applications of the present invention. Services data 275 may include information relating to the financial services 270. For example, as bond prices fluctuate, they may be updated in the services database 275 thereby ensuring that any financial service calculation or simulation relying on current bond will producer the most accurate results.

Customer database 280 may comprise information relating to current or prospective customers including, for example, the customer's name, date of birth, address, telephone numbers, family details, health information, income, investments, accounts and the like. This information may be consumed by financial services 270 to assemble scenarios and projections as well as provide a financial advisor insight into the situation and needs of the customer.

Application database 285 may comprise any information used by any other application and/or component of the present invention. Application data 285 may represent XML schemas which define how data will be processed and presented. It may also contain information defining any number of preconfigured reports that may be used by a report generator to produce reports. Practitioners will appreciate that application data 285 may comprise any number of databases, database systems and configurations.

The various system components as illustrated in FIG. 2 and previously discussed are presented for the purpose of understanding and are not intended to limit the scope of the present invention in any way. Practitioners will appreciate that there are any number of known system architectures, application components and networks that could be combined to deliver the functionality of the present invention. For example, the various servers of the FS 205 as illustrated may reside as software and/or hardware components within a single computing device or may be distributed in one or more hardware and/or software systems. Further, in another embodiment, an IS 210 may not be included and all connections to the components of the FS 205 may be directed and managed through any other means known in the art.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. user computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, "INTERNET STANDARDS AND PROTOCOLS" (1998); "JAVA 2 COMPLETE," various authors, (Sybex 1999); DEBORAH RAY AND ERIC RAY, "MASTERING HTML 4.0" (1997); and LOSHIN, "TCP/IP CLEARLY EXPLAINED" (1997) and DAVID GOURLEY AND BRIAN TOTTY, "HTTP, THE DEFINITIVE GUIDE" (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, "UNDERSTANDING DATA COMMUNICATIONS" (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, provider, issuer, user or the like. Furthermore, the security information may restrict/permit only certain actions such as accessing, modifying, and/or deleting data sets. In one example, the data set annotation indicates that only the data set owner or the user are permitted to delete a data set, various identified providers are permitted to access the data set for reading, and others are altogether excluded from accessing the data set. However, other access restriction parameters may also be used allowing various entities to access a data set with various permission levels as appropriate.

The data, including the header or trailer, may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, "IT WEB SERVICES: A ROADMAP FOR THE ENTERPRISE" (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography," by Jonathan Knudson, published by O'Reilly & Associates (1998); (3) "Cryptography & Network Security: Principles & Practice," by William Stalling, published by Prentice Hall; all of which are hereby incorporated by reference.

Each financial advisor may be equipped with a computing device in order to interact with the system and facilitate online financial advise and financial product sales. The financial advisor may have a computing unit in the form of a personal computer, although other types of computing units may be used including laptops, notebooks, tablet PCs, hand held computers, set-top boxes, cellular telephones, touch-tone telephones and the like. The financial advisor has a computing unit implemented in the form of a tablet PC, although other implementations are contemplated by the invention. Financial services provider has a computing center shown as a number of servers. However, financial service provider's computing center may be implemented in other forms, such as a mini-computer, a PC server, a network of computers located in the same of different geographic locations, or the like. Moreover, the system contemplates the use, sale or distribution of any services or information over any network having similar functionality described herein.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Figure 3:
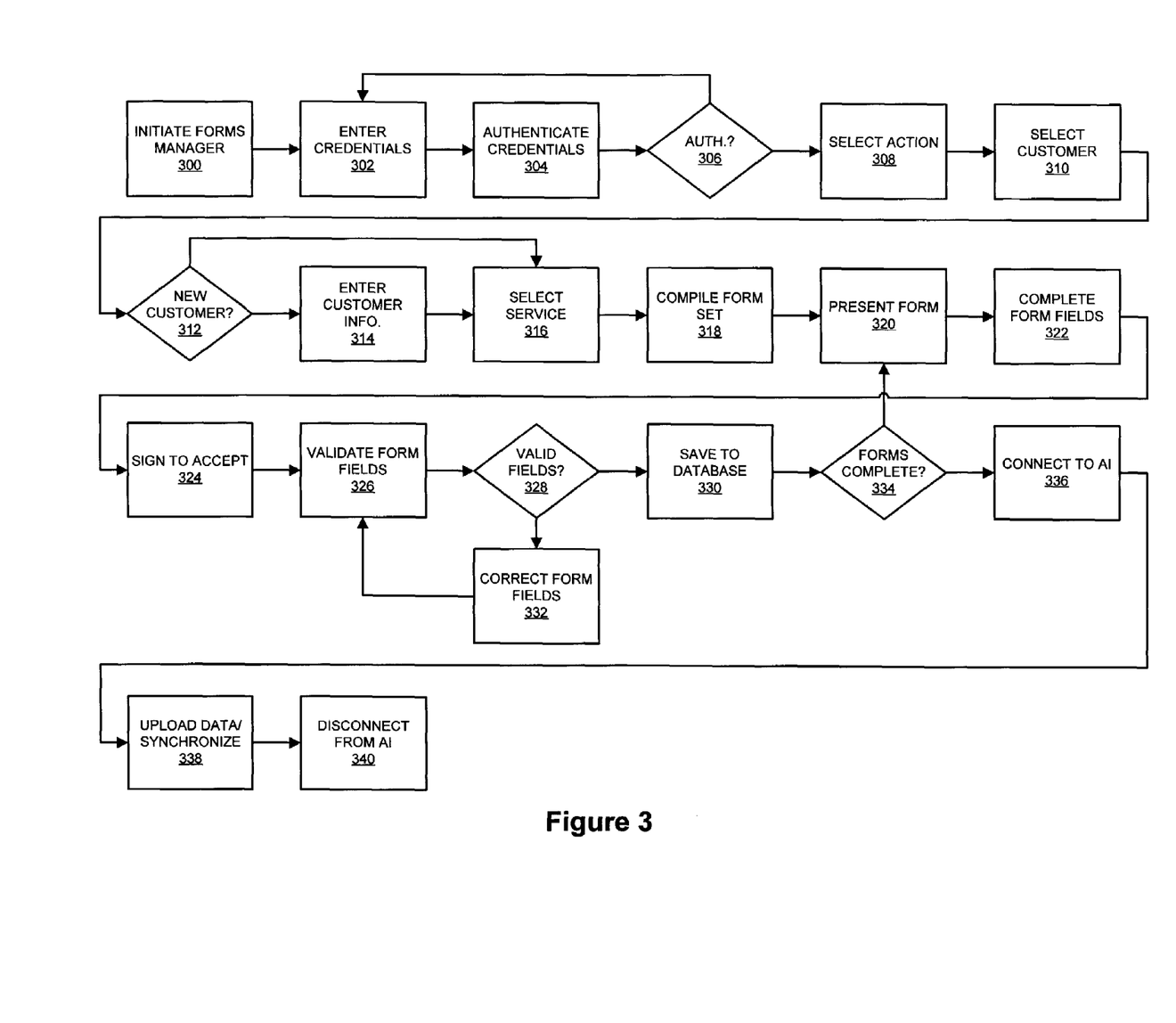
FIG. 3 is a flow chart illustrating an exemplary method for compiling and completing electronic forms in a remote environment.
Figure 4:
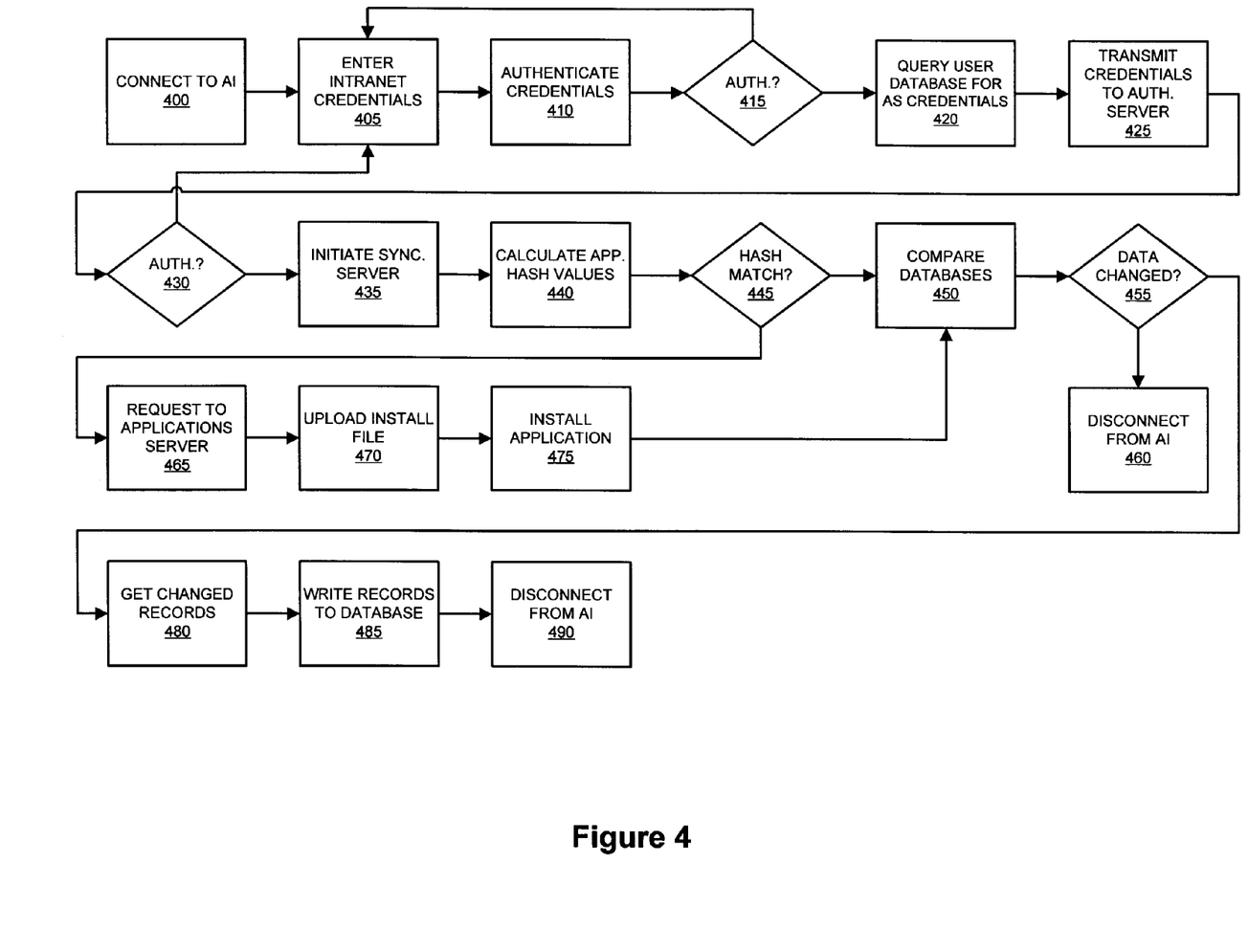
FIG. 4 is a flow chart illustrating an exemplary method for synchronizing executable code and data between a remote user computing device and the main system components of the financial institution.

Referring now to FIGS. 3-4, the process flows as illustrated are merely exemplary embodiments of the invention and are not intended to limit the scope of the invention as described above. For example, the steps recited in any of the method or process descriptions may be executed in any order and are not limited to the order presented. It will be appreciated that the following description makes appropriate references not only to the steps illustrated in FIGS. 3-4, but also to the various system components as described above with reference to FIGS. 1-2. Further, illustrations of the process flows and the descriptions thereof may make reference to user interface windows, webpages, websites, web forms, prompts, etc. Practitioners will appreciate that the illustrated steps described below may exist in any number of configurations including the use of webpages, web forms, windows, popup windows, prompts and the like. It should be further appreciated that the multiple steps as illustrated and described may be combined onto single webpages or user interface windows but have been expanded for the sake of simplicity. In other cases, steps illustrated and described as single process steps may be broken down into multiple webpages or user interface windows but have been combined for simplicity.

FIG. 3 is a flow chart illustrating an exemplary method for compiling and completing electronic forms in a remote environment. While directed toward managing electronic forms in a remote environment, practitioners will appreciate that a very similar process may be applied to a connected client. Because financial advisors often visit customers at their homes or places of business, there is not always a reliable connection source readily available. While a connection to an IS 210 may be possible through a telephone line or wireless internet connection at a customer site, this may not always be the case. Further, such connections are often slow and unreliable.

A financial advisor equipped with a portable computing unit, such as a tablet PC, may activate a forms manager (step 300). Forms manager (step 300) may include a stand-alone software application with its own user interface or any number of code components to generate HTML pages which may be viewed through a browser application. Because the forms manager may contain data that is personal and private to customers, the financial advisor may be prompted to enter credentials (step 302). Credentials may include a user ID, password, pass code, or a combination thereof. After entering and submitting credentials, a forms manager may authenticate the credentials (step 304) by querying a local security database. A local security database may comprise a replicated portion of the authentication database 250 of the FS 205. If this is the case, then the users' credentials may be the same credentials they would enter when connecting to an FS 205.

If credentials are not authenticated (step 306), then the financial advisors may again be prompted to enter their authentication credentials (step 302). However if the credentials are authenticated, then the financial advisor may be prompted to select an action (step 308). Actions may include reviewing previously completed forms, synchronizing the remote client 225 with an FS 205, or creating forms for completion. For the purpose of this illustration, only the later will be discussed. The synchronization process will be discussed in greater detail in relation to FIG. 4.

A financial advisor may be prompted to select a customer (step 310) for whom the forms will be created. A list of current customers may be queried from a local database that was replicated from a customer database 280. In one embodiment, a financial advisor may enter the name or partial name of the customer into a text field in order to initiate a search for customers matching the entered name or partial name. If the customer does not exist in the database and is a new customer (step 312), then the financial advisor may be presented a form and prompted to enter customer information (step 314). Customer information may include, for example, customer's name, address, telephone number, email address, birth date, social security number and the like. A financial advisor may enter customer information (step 314) on behalf of the customer (i.e. an interview process), or may ask the customer to enter their own information into a pen based tablet PC or notebook computer.

Following selection of an existing customer (step 310) or entering information to create a new customer (step 314), a financial advisor may be prompted to select a financial service (step 316). Financial services may comprise any number of individual services that a financial services organization may offer to private individuals and/or businesses. For example, a financial services organization may offer services for retirement accounts, investment accounts, lines of credit, banking, insurance, and the like. Based on a selection of a financial service (step 316), forms manager may query a local database to identify the forms that will be required to complete the transaction for the selected service. Based on this information, a set of forms may be compiled (step 318) and presented in a predefined order. On presentation of a form (step 320) from the form set, a financial advisor may begin to enter customer information into form fields (step 322) on behalf of the customer (i.e. an interview process), or may ask the customer to enter their own information into a pen based tablet PC or notebook computer.

Following the completion of a form (step 322), a customer may be prompted to review the form for accuracy and sign the form as necessary (step 324). One or more signatures may be required on a form according to law or company policy. In order to obtain a true legal signature, a customer may be directed to sign using a pen based tablet PC or any other computing device equipped to enable free form text entry or the entry of any type of code to substitute for a signature. Practitioners will appreciate that such devices are commercially available and known in the art. A signature may be stored as a bitmap image while other data entered into a form may be converted to text. To facilitate conversion of free-hand text entry into ASCII text that may be electronically processed and stored in one or mare files or databases, the present invention may employ optical character recognition (OCR) software. Such software is commercially available and increasingly reliable. For example, Microsoft has included a class file, Microsoft.ink, to it's Visual Studio.Net™ development suite to enable developers to include character recognition capabilities within their software applications. Microsoft.ink provides character recognition logic which can be very effective in recognizing different print styles.

Following the entry of a signature into a form (step 324), the forms manager may convert the free-hand text into ASCII characters that may be validated to check for spelling errors and to ensure that the format of the text is appropriate for each form field (step 326). For example, a forms manager may convert a birth date field to ASCII text and determine that a birth date of Apr. 19, 1848 has either been entered into the form incorrectly, or converted to ASCII text incorrectly.

If a field cannot be validated for any reason (step 328), then a financial advisor and/or customer may be alerted and presented an opportunity to correct or re-enter the text into the form field (step 332). Once again, the form fields may be validated (step 326) to ensure accuracy. When all form fields have been validated, (step 328) then the form data may be stored within a local database (step 330) and the forms manager may verify whether or not all desired forms for the selected financial service have been completed. If all forms are not complete (step 334), then a financial advisor and/or customer may be presented with the next form in the form set (step 320). If all required forms have been completed (step 334), then a financial advisor may connect the remote client to an AI (step 336). The step of connecting to an AI (step 336) may be performed at any time following an appointment with a customer. For example, a financial advisor may routinely communicate with an AI (336) at the end of the work day when she has returned to her hotel room.

When the remote client 225 has established a connection to an IS 210 and has entered appropriate credentials to be authenticated, then intranet server 235 may send a request to an applications server 260. Applications server 260 may initiate a synchronization server 255 that may begin the process of uploading data from the remote client's 225 local database and synchronizing the data (step 338) with the counterpart one or more databases in the backend 200. When synchronization is complete, the remote client 225 may disconnect from the IS 210. The synchronization process will be presented in greater detail below.

FIG. 4 is a flow chart illustrating an exemplary method for synchronizing executable code components and data between a remote user computing device and the main system components of the financial institution. The synchronization process may be performed at any interval as determined by a financial services organization and/or financial advisor. It may be advantageous to synchronize a remote client 225 local database with the one or more backend 200 databases soon after a sale or modification of financial services. Synchronization may occur in batch format, real-time or any other interval.

When a connection is established between a remote client 225 and an IS 210 (step 400), a financial advisor may be prompted to enter intranet credentials (step 405) in order to ensure that the financial advisor is an authorized user. When credentials are entered and submitted at the remote client 225, an intranet server may query its user database 240 to authenticate the credentials (step 410). If the credentials are not authenticated (step 415), either through error or unauthorized use, the financial advisor may again be prompted to enter intranet credentials (step 405).

Following a successful authentication (step 415), an intranet 235 may query a user database 240 for authentication server 245 credentials (step 420). Storing authentication server credentials in an intranet database 240 may eliminate the need for a financial advisor to enter two sets of credentials when connecting to synchronize. However, in another embodiment, it may be desirable to require a connecting financial advisor to enter two sets of credentials in order to add a second layer of security to the system of the present invention. In either case, the financial advisor's credentials may be transmitted to an authentication server (step 425). Authentication server 245 may query an authentication database 250 to determine if the credentials match those stored in the authentication database 250. If authentication server credentials are not authenticated (step 430), then a financial advisor may be prompted to again enter intranet credentials (step 405). When authentication server 245 credentials are authenticated, a synchronization request may be transmitted to an application server 260 which may initiate a synchronization server (step 435).

A synchronization server 255 may use any number of means known in the art to determine if changes have been made to code components, form components and databases. A synchronization server 255 may calculate a hash code value for from components and/or code components residing on a connected remote client (step 440). Likewise, a synchronization server 255 may calculate the hash code value of corresponding form components and/or code components residing in an FS 205 or backend 200. The two hash values may be compared to determine if they match (step 445). If they do not match, indicating that a change has been made to the form and/or code components, then a request may be transmitted to an applications server (step 465). Applications server 260 may upload an install file (step 470) to a remote client 225. Following a load of an install file, remote client 225 may initiate the install file to install the latest version of the forms and/or code components (step 475).

Practitioners will appreciate that there are a number of means known in the art for comparing two or more form or code components in order to determine if changes were made to one or more of the form or code components. For example, version information and/or modification date may be extracted from two or more form or code components to determine if changes were made.

An applications server may send a request to a remote client 225 in order to extract data from the remote client's 225 one or more local databases 290. This data may be compared to data in one or more corresponding databases in the backend 200 to insure that one or more records do not already exist (step 450). If it is determined that the data from the remote client's 225 one or more databases 290 is different than the data contained in the one or more corresponding databases in the backend 200 (step 455), then logic may be employed to determine the nature of the changes.

For example, if a customer record is found to exist in a remote client's 255 local database 290 and in a corresponding backend 200 database, then determination will need to be made as to which record was modified most recently. Applying a set of rules, a synchronization server 255 may determine how data in the backend database should be modified. Synchronization server 255 may extract data that has been changed (step 480) and write the data to the appropriate one or more databases (step 485) residing in either a remote client 225 or backend 200.

If synchronization server 255 determines that there has been no changes of data between one or more of remote client's 225 local databases 290 and the corresponding one or more backend 200 databases (step 455), then remote client 255 may disconnect from an intranet server (step 460).

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method for managing electronic forms, said method including:

establishing a connection from a remote device to a host, wherein said host interrogates said remote device to identify remote executable code and remote form components;

causing said host to calculate a first remote hash value for said remote executable code, wherein said first remote hash value is compared with a first host hash value for a corresponding first host executable code;

receiving said host executable code to update said remote executable code to create updated remote executable code, wherein said host executable code is received from said host when said first remote hash value does not match said first host hash value and, wherein said remote executable code is not updated when said first remote hash value does match said first host hash value;

updating said remote executable code with said undated host executable code;

causing said host to calculate a second remote hash value for said remote form components, wherein said second remote hash value is compared with a second host hash value for corresponding host form components;

receiving said host form components to update said remote form components to create undated remote form components, wherein said host form components is received from said host when said second remote hash value does not match said second host hash value and, wherein said undated remote form components are used by said undated remote executable code to compile forms and, wherein said remote form components are not undated when said second remote hash value does match said second host hash value;

updating said remote form components with said updated remote form components;

compiling, by said undated remote executable code, a subset of said updated remote form components based upon a service type selection, wherein said updated remote form components include form fields;

receiving form data into said form fields of said subset of said updated remote form components to create a plurality of remote forms;

validating said form data to identify at least one of: missing data and improperly formatted data;

receiving corrected form data when said at least one of: missing data and improperly formatted data is identified;

storing said form data in a remote database; and, communicating with said host to transmit said form data to said host, thereby causing said host to map said form data to database record fields within a host database, causing said host to determine when a data change to a value in said data field exists and, causing said host to synchronize said host database with said form data when said data change exists.

2. The method of claim 1, further including synchronizing said subset of said host form components with said remote database.

3. The method of claim 1, further including synchronizing a host application with a remote application.

4. The method of claim 1, wherein causing said host to map includes causing said host to map using pre-determined mapping rules.

5. The method of claim 1, wherein said step of causing said host to calculate hash values includes:

determining a first hash value based on said form data;

determining a second hash value based on a record of said host database corresponding to said form data; and, determining whether there is a difference between said first hash value and said second hash value.

6. The method of claim 1, further including verifying credentials of a user of said remote device.

7. The method of claim 1, wherein said compiling further includes arranging said subset of said undated remote form components according to a predefined order.

8. The method of claim 1, wherein said service type selection includes at least one of retirement account, investment account, line of credit, banking, and insurance.

9. The method of claim 1, further including converting free-hand text entry of said form data into text.

10. The method of claim 1, further including replicating authentication data from said host to said remote device.

11. The method of claim 1, further including replicating customer data from said host to said remote device.

12. The method of claim 1, further including processing said data to verify at least one of spelling and format.

13. A machine-readable medium having stored thereon a plurality of instructions, the plurality of instructions when executed by a processor, cause said processor to perform a method comprising the steps of:

establishing a connection from a remote device to a host, wherein said host interrogates said remote device to identify remote executable code and remote form components;

causing said host to calculate a first remote hash value for said remote executable code, wherein said first remote hash value is compared with a first host hash value for a corresponding first host executable code;

receiving said host executable code to update said remote executable code to create undated remote executable code, wherein said host executable code is received from said host when said first remote hash value does not match said first host hash value and, wherein said remote executable code is not undated when said first remote hash value does match said first host hash value;

updating said remote executable code with said undated host executable code;

causing said host to calculate a second remote hash value for said remote form components, wherein said second remote hash value is compared with a second host hash value for corresponding host form components;

receiving said host form components to update said remote form components to create undated remote form components, wherein said host form components is received from said host when said second remote hash value does not match said second host hash value and, wherein said undated remote form components are used by said undated remote executable code to compile forms and, wherein said remote form components are not updated when said second remote hash value does match said second host hash value;

updating said remote form components with said undated remote form components;

compiling, by said undated remote executable code, a subset of said updated remote form components based upon a service type selection, wherein said undated remote form components include form fields;

receiving form data into said form fields of said subset of said updated remote form components to create a plurality of remote forms;

validating said form data to identify at least one of: missing data and improperly formatted data;

receiving corrected form data when said at least one of: missing data and improperly formatted data is identified;

storing said form data in a remote database; and, communicating with said host to transmit said form data to said host, thereby causing said host to map said form data to database record fields within a host database, causing said host to determine when a data change to a value in said data field exists and, causing said host to synchronize said host database with said form data when said data change exists.

* * * * *

UNITED STATES PATENT AND TRADEMARK OFFICE
CERTIFICATE OF CORRECTION

PATENT NO. : 7,315,978 B2 Page 1 of 1
APPLICATION NO. : 10/710748
DATED : January 1, 2008
INVENTOR(S) : Christopher David Giles It is certified that error appears in the above-identified patent and that said Letters Patent is hereby corrected as shown below:

In column 17, line 64, please delete "undated" and replace with --updated--.
In column 18, line 4, please delete "undated" and replace with --updated--.
In column 18, line 8, please delete "undated" and replace with --updated--.
In column 18, line 9, please delete "undated" and replace with --updated--.
In column 18, line 11, please delete "undated" and replace with --updated--.
In column 18, line 15, please delete "undated" and replace with --updated--.
In column 18, line 53, please delete "undated" and replace with --updated--.
In column 19, line 12, please delete "undated" and replace with --updated--.
In column 19, line 16, please delete "undated" and replace with --updated--.
In column 19, line 17, please delete "undated" and replace with --updated--.
In column 19, line 25, please delete "undated" and replace with --updated--.
In column 19, line 29, please delete "undated" and replace with --updated--.
In column 20, line 1, please delete "undated" and replace with --updated--.
In column 20, line 5, please delete "undated" and replace with --updated--.
In column 20, line 7, please delete "undated" and replace with --updated--.
In column 20, line 9, please delete "undated" and replace with --updated--.

Signed and Sealed this

Third Day of June, 2008

JON W. DUDAS
*Director of the United States Patent and Trademark Office*